United States Patent [19]

Izumi

[11] 4,008,333

[45] Feb. 15, 1977

[54] SOY SAUCE BREWING METHOD

[76] Inventor: Masahiko Izumi, 26-8, 5-chome, Hiikawa, Nishi, Fukuoka, Fukuoka, Japan

[22] Filed: May 21, 1975

[21] Appl. No.: 579,729

[52] U.S. Cl. .................................. 426/44; 426/46
[51] Int. Cl.² .......................................... A23L 1/20
[58] Field of Search .............. 426/46, 519; 195/109

[56] References Cited

UNITED STATES PATENTS

| | | | |
|---|---|---|---|
| 3,068,155 | 12/1962 | Stich | 195/109 |
| 3,405,920 | 10/1968 | Lefrancois | 195/109 |
| 3,625,834 | 12/1971 | Muller | 195/109 |
| 3,793,152 | 2/1974 | Sassa | 195/109 |
| 3,878,302 | 4/1975 | Luksas et al. | 426/46 |

*Primary Examiner*—A. Louis Monacell
*Assistant Examiner*—C. A. Fan
*Attorney, Agent, or Firm*—Browdy and Neimark

[57] ABSTRACT

A method of producing soy sauce of superior quality by means of a large capacity closed-type tank in mass production and in a relatively short time, is characterized by the following steps in a soy sauce brewing method: charging soy sauce moromi into a closed large capacity tank provided with a hollow inner cylinder for circulation of moromi, adding enzyme to the system, on one hand feeding inert gas including the necessary minimum amount of oxygen, on the other hand degasing the fermentation system resulting in reduced pressure or vacuum at the top portion of the tank, removing carbon dioxide gas and thus promoting circulation and fermentation of moromi, and reutilizing the useful volatile constituent.

5 Claims, 1 Drawing Figure

SOY SAUCE BREWING METHOD

FIELD OF INVENTION

The present invention relates to the production of soy sauce, and more particularly, to an improved method and apparatus for brewing soy sauce and the resultant product.

BACKGROUND OF THE INVENTION

Naturally brewed soy sauce is produced by putting koji into a charging device having an appropriate amount of salt water and fermenting this koji. However, koji is lighter than salt water, i.e. it has a lower specific gravity, and it also includes fat constituents, such as soybean, and these constituents have water repelling properties and accordingly water absorption is difficult, thus resulting in the floating of a thick layer of koji on the salt water. In such a case, it is necessary to agitate to make good contact between the koji and salt water; however, when a mechanical device is used to perform the agitation, it is inevitable that the agitation effect becomes excessive resulting in a moromi having excess viscosity. Here and hereinafter moromi means the mixture of koji and salt water and koji means the starter prepared from the mixture of steamed soybean and burned wheat, inoculated with spores of Aspergillus oryzae and permitted to develop mycelia.

Therefore, the usual manner of making soy sauce involves a very long period for the water absorption of the koji such as about one year according to a prior natural brewing method.

Shortening of the production period has been a great problem so far in the art. Since agitation of moromi cannot be done effectively, when using a large capacity tank, carbon dioxide gas is not discharged out of the system between the intermediate portion and the bottom portion; however, if the $CO_2$ is not discharged, putrefaction may arise. Accordingly, in accordance with recent techniques it has been impossible to produce soy sauce in quantities by means of a large capacity tank such as 200 or 300 kl, and moreover since the prior soy sauce brewing system is an open-system, volatile constituents such as alcohol, sugar, fragrance constituent and so forth volatilize out of the system, thus causing deterioration of quality and reduction of yield. Such drawbacks have been inevitable in the prior art.

SUMMARY OF THE INVENTION

The present invention solves these drawbacks. It is, accordingly, an object of the present invention to overcome the defects of the prior art, such as indicated above; and it is another object to provide for the improved preparation of soy sauce.

A further object of the present invention is to produce soy sauce of superior quality in a short period and in mass production by agitating moromi smoothly and removing carbon dioxide gas, using a closed system thus preventing invasion of infectious microbes and volatilization of useful constituents such as flavoring component and also eliminating the reduction of yield of moromi.

In order to realize these objects, various aspects have been studied, such as the construction and shape of the brewing tank, chemical and physical criteria for promoting fermentation, the entire fermentation system, and so forth; as a result the present invention has been completed. Therefore the present invention is characterized by adopting a number of novel and useful features which have never been used heretofore and also combining these systems organically.

The present invention also provides a soy sauce brewing method comprising charging soy sauce moromi in a brewing tank of closed-type large capacity provided with an inner cylinder for circulation, adding enzyme or enzyme including substance, on one hand feeding to the system inert gas (preferably warmed) including a necessary minimum amount of oxygen as needed, and on the other hand degassing the fermentation system thereby providing reduced pressure or vacuum at the upper portion of the tank, removing carbon dioxide gas and promoting circulation and fermentation of the moromi, and regarding volatile constituents such as alcohol, sugar and flavoring components recycling these together with the feed gas to the moromi without discharging them outside the system, or recovering these constituents and readding them to the soy sauce moromi.

The invention will be described in detail hereinafter on the basis of the drawing which diagrammatically shows an embodiment of the invention.

BRIEF DESCRIPTION OF DRAWING

The attached FIGURE is a longitudinal sectional view partly schematic, showing an embodiment of a soy sauce brewing apparatus for carrying out the present invention.

DETAILED DESCRIPTION OF EMBODIMENT

In order to carry out the present invention, it is convenient to use an apparatus as follows. A closed brewing tank 1 has a cylindrical shape and contains therewithin a hollow circulation inner cylinder 2. Suitable heating means 2a are provided within the wall portion of the circulation inner cylinder 2. When moromi is charged to such a tank 1, the moromi near the heating coils 2a of the circulation inner cylinder 2 is warmed and lightened in specific gravity so that it rises along the inner wall of the inner cylinder 2. Also, the fermenting moromi includes carbon dioxide gas and therefore this gas rises along the inner wall of the inner cylinder 2 as the mixture is heated, and when the flowing mass approaches the upper surface of the mass, the carbon dioxide gas in the moromi makes bubbles and these are released into the upper space of the tank above the liquid level.

The moromi which has released its carbon dioxide gas thus increases its specific gravity thereby becoming heavy, so that it begins to circulate downwards, and since carbon dioxide gas content is low, the fermentation is promoted accordingly; as a result the brewing period of soy sauce can be shortened as a whole. Moreover, the moromi which has been raised to the upper surface, due to the action of the inner circulation cylinder 2, as pointed out above becomes cooled as the carbon dioxide gas escape due to the latent heat of evaporation and because the interior of the tank at its upper portion is maintained under reduced pressure or vacuum with the result that the moromi has a tendency to descend along the tank wall 1, and accordingly this further facilitates the circulation of moromi.

Therefore it is preferable to maintain an appropriate temperature gradient between the inner wall of the tank 1 and the circulation inner cylinder 2. Usually, the outer wall of the tank 1 is surrounded by a jacket, and cooling is carried out by passing a cooling medium through cooling coils 1a or by using other suitable means, and at the heating portion 2a of the circulation inner cylinder 2, an electric heater is provided or a pipe passing heating medium is spirally provided around this cylinder 2; and also if necessary the outer wall of the inner cylinder 2 may be cooled. The temperature gradient may be about 1° to 8° C suitably; however it is preferably 2° – 4° C.

In such a moromi circulation system utilizing the difference in specific gravity of moromi caused by temperature gradient and dissipation of carbon dioxide gas, specially at the beginning after charging of moromi, water absorption of koji still takes a longer period than is desirable and as a result in this system circulation and agitation of moromi is not carried out sufficiently. Accordingly, in order to further facilitate the circulation and agitation of moromi, it is necessary to adopt some further means to assist water absorption of the koji.

Firstly, relating to device improvement, a filter plate 3 for solid-liquid separation is provided at the lower portion of the tank, whereby moromi liquid is withdrawn from the lower portion of the tank 1 and this liquid is re-injected into the tank 1 through an injection pipe 32 by means of a pump 31.

In order to further facilitate the circulation of moromi, it is an indispensable step of the present system to feed a gas for circulating moromi to the bottom portion of the tank. The temperature of the feed gas may be room temperature; however if the gas is warmed to the same temperature as or more than that of moromi in the tank, a better result will be obtained. A reason for this is that when cool gas contacts the warm moromi in the tank, the temperature of the moromi lowers, so that the fermentation is slowed and the viscosity of the moromi increases and thus the circulation of moromi cannot be smoothly carried out. The temperature of the feed gas varies between about 20° and 50° C according to the condition such as composition of moromi, tank capacity and so forth. In a usual case, the range of about 25° to 35° C is preferable, however 28° to 30° C is the most preferable.

Ventilation inlets for the warmed gas and the number thereof may be decided suitably by need, however it is preferable to provide one to several at the lower portion of the inner cylinder 2 for moromi circulation (or at the outer cylinder). Due to the feeding of warm gas, moromi at the central portion of the tank, where heat transmission is very bad, is warmed. As a result, the fermentation of moromi becomes equalized in the tank (it is very difficult to uniformly warm and ferment mixture of solid and liquid as soy sauce, particularly the more the tank capacity becomes large, the more it becomes difficult, and heretofore it has been impossible to brew soy sauce by means of a large capacity tank), and the viscosity of moromi is lowered and the circulation thereof becomes smooth and thus the supply of oxygen and removal of carbon dioxide gas become smooth, so that putrefaction of moromi is prevented and the rate of fermentation is further increased resulting in great shortening of the soy sauce brewing period. Also, it is possible to control the rate of fermentation by changing the temperature of the warmed gas.

As the ventilation gas, either oxygen or an oxygen including gas, such as air, may be used, and the gas need be fed to the system periodically only several times a day, each time for about 3 or 5 minutes. However, if oxygen exists in excess, the moromi is oxidized thus becoming worse in quality, and accordingly it is convenient and preferred to use an inert gas including a minimum amount (about 3–5%) of oxygen necessary for the fermentation of moromi instead of pure oxygen. As the inert gas, any gas inactive to the moromi, such as nitrogen, carbon dioxide gas, helium, neon, argon, krypton and xenon may be used; however nitrogen is particularly preferable.

The inert gas, including the minimum necessary amount of oxygen (equivalent amount of air may be used), is preferably subjected to sterilization as well as temperature adjustment, and the feeding rate of the mixed gas may be suitably varied in accordance with raw material of moromi, temperature of fermentation and so forth; however generally it is preferably about 700 to 1500 liter per hour per 1000 liter tank. As one preferable embodiment of a suitable warmed inert gas including a minimum necessary amount of oxygen, there is mentioned one that is produced by burning air to remove the unnecessary amount of oxygen and cooling the resultant air reduced in oxygen content to a suitable temperature.

When the above mentioned gas is fed into the moromi, useful volatile constituents such as soy sauce flavor, alcohol, sugar and so forth, and carbon dioxide gas are discharged together with the feed gas. The carbon dioxide gas is removed to outside the system from the moromi as fast as possible because this is convenient for shortening of the soy sauce brewing period and the improvement of quality of soy sauce. As to the other useful volatile constituents, these are not removed, but subjected to recirculation or recovered and added again into the moromi. Accordingly, in the present invention it is necessary to make all the system a closed type, and in this respect this invention is completely different from the prior art open system.

The recovery of useful volatile constituents in the closed type tank 1 is carried out by the following system. An outlet pipe 7 for the discharged gas is provided above the closed type large capacity tank, the outlet pipe 7 being connected to an inlet pipe 20 for the feed gas through a circulation pump 19. The inlet pipe 20, through pipes 17 and 18, is connected to the bottom portion of the tank 1 (preferably to the inner cylinder portion 2), and a gas-liquid separating tower 33 is provided as a waste gas discharge port and the inlet pipe 20 is provided as a fresh mix gas feeding port.

Using such a closed system, the moromi is agitated by the inert gas (this may be warmed), so that agitation and circulation are attained smoothly, and unnecessary carbon dioxide gas is removed and a necessary amount of oxygen is introduced, so that the fermentation of moromi proceeds satisfactorily, and as a result the soy sauce brewing period can be shortened.

Also, the amount of oxygen which is used is a necessary minimum amount, preferably 3–5%, and in comparison with the prior art open system, there is no loss in flavoring constituent, sugar, alcohol and so forth, and the reduction of yield of moromi is small and also the moromi is not excessively oxidized, and accordingly the quality of the resulting soy sauce is improved remarkably.

There is in the soy sauce industry a problem of contamination by infectious microbes; this is one of the most noticable problems in the fermentation industry. In the case of the prior open system, this problem always exists. However, in the case of using the closed type system and inert gas, preferably warmed, it is only necessary to pay attention to contamination of the feed gas at the time of introduction, and therefore the problem of contamination is solved nearly perfectly, by purifying the feed gas.

One feature of the present invention is the introduction into the method of the physical system in which the fermentation system is degassed thereby providing reduced pressure or vacuum in the upper portion of the closed type large capacity tank. When pressure in the fermentation system is reduced, carbon dioxide gas, which is a fermentation inhibiting substance, is removed from the system and at the same time the carbon dioxide gas which is generated at the interior or bottom portion of the moromi tank is rapidly discharged outside the moromi into the open space at the top of the tank 1. As a result the moromi, which is originally of high viscosity and difficult to agitate, can be easily agitated because the movement of the circulating gas becomes smooth due to the transfer of the carbon dioxide gas.

The moromi in the lower portion of the large capacity tank is under very great pressure due to the weight of moromi itself, and therefore the carbon dioxide gas generated during fermentation cannot escape from the moromi, and thus generally the moromi in the lower portion of the tank ferments slower than that in the upper portion and causes putrefaction. However, according to the present invention, since the upper portion of the tank is degassed and a pressure difference between the interior and the outside of the moromi is utilized, such drawbacks can be removed and an advantage such as shortening of production period and/or improvement of quality can be obtained.

In addition, a more noticeable feature is that in cooperation with the discharge mechanism of this carbon dioxide gas, gas for moromi agitation injected to the bottom portion of the tank also increases the motility of the moromi and it can thereby be rapidly circulated and agitated; these treatments are promoted by using warmed gas.

The feeding of the mixed gas is usually continued for almost 2 – 3 months from just after the charging into the tank of the moromi, and after this period upon reaching the ripening stage, the feeding of outside gas to the system is done only occasionally or the ripening is effected without any feeding of outside gas. The soy sauce brewing may be completed after 4 to 8 months.

The degassing treatment is to provide reduced pressure or vacuum in the interior of the system, and for this purpose any device which is capable of accomplishing this operation can be used; however, a vacuum pump 9 or the like is preferably used. The degree of pressure reduction varies according to kinds of moromi, quantity, content of carbon dioxide gas etc. and it can range from 750 mm Hg to vacuum broadly. Nevertheless, it is necessary to avoid to continue to exert an excess pressure reduction for a long period because it may effect a bad effect on the moromi. The vacuum pump 9 may be provided at any position in the closed system, but usually it is preferably disposed at a suitable position along the pipe 7 connecting the upper and lower portions of the tank 1.

When the degassing is performed by using a vacuum pump 9, besides carbon dioxide gas which is a fermentation inhibiting substance, useful volatile constituents such as soy sauce flavoring constituent, alcohol, etc. are also degased therewith; hence it is necessary to separate carbon dioxide gas and the useful volatile constituents by means of the separating tower 33.

Another feature of the present invention lies in adoption of biochemical system. As indicated above, moromi generally has a very high viscosity, with the result that agitation and circulation are inhibited or prevented. However, when moromi is subjected to decomposition by the use of enzyme, circulation and agitation of moromi become smooth and at the same time quality of the product is improved, and no harmful results ensue.

Moromi consists mainly of starch, protein and fat. Therefore the enzyme selected for addition is one which can decompose these constituents. For example a starch decomposing enzyme may be selected from a group comprising α-amylase, β-amylase, gluco-amylase, phosphorylase, isomaylase, lysozyme, amylo-1, 6-glucosidase and cellulase. A protein decomposing enzyme is selected from the group comprising protease, ficin, bromelin, papain, trypsin, kimotrypsin, polypeptidase, etc., and as a fat decomposing enzyme, lipase etc. are included.

Except for such pure enzyme products, any substance including such a product, for example malt or malt extract, or culture product of enzyme producing microorganism and so forth can be used. The amount of enzyme used varies in accordance with kind of moromi raw material, composition, pH and temperature of the raw material etc., but generally a suitable quantity will lie within a range of 0.01 to 1.0 weight % per moromi. The enzyme may be added from the beginning of the fermentation or in mid-course of fermentation; the desired amount may be added at one time or dividedly, e.g. a first dose at the beginning and a second dose at mid-course. An advantage arising from the use of enzyme, besides those mentioned above, is that it becomes possible to change the fermentation speed by changing kind or amount of enzyme used or to give a particular delicate taste and smell to soy sauce product thereby.

As described above, according to the present invention, very superior advantages can be attained by adopting novel and useful treating steps such as the provision of an inner cylinder for moromi circulation, providing a closed system, adoption of pressure reduction treatment, removal of carbon dioxide gas, reuse of useful volatile constituents, feeding of cool or warmed inert gas, from outside the system circulation and spreading treatment of moromi liquid and decomposition of moromi by enzyme, and also by combining these steps organically. That is to say, high quality soy sauce can be produced within a very short period by use of these expedients. Also, it becomes possible to use an outdoors type large capacity tank such as, for example, one 5 to 20 m in height and having a capacity of 200 to 300 K1, which has been heretofore thought impossible to use, and as a result production of soy sauce on large scale is made possible. The present invention is not limited to the use of only one brewing tank, and can use a plurality of such tanks connected with each other. Moreover, relating to the moromi under ripening treatment after the completion of fermentation, if any one of alcohol and flavoring constituent etc. is insufficient, it is also possible to supply such a useful constituent into the moromi by feeding a volatile constituent including mixed gas through the moromi.

Next, a preferred embodiment of the present invention will be described in detail hereinafter, however this is only for detailed explanation of the present invention, and not to limit the present invention to the embodiment only. It should be understood that the example can be modified without departing from the scope and spirit of the invention.

EXAMPLE

A closed type moromi tank 1 of 200 K1 capacity is used. This tank 1 is cooled to about 25° C by surrounding it by a coiled pipe or jacket 1a. The tank 1 is provided with a cover 11. Within the tank 1 is provided an inner cylinder 2 for moromi circulation. The inside wall of the inner cylinder 2 is warmed to about 28° C by means of a coiled pipe or electric heater 2a or the like, and the outside wall thereof is cooled like the outside wall of the tank 1. Inside the coiled pipes 1a and 2a, temperature adjusting medium for warming or cooling may be respectively circulated by means of circulation pumps 1b, 2b through heat exchangers 1c, 2c.

The moromi tank 1 is charged with 12 tons of koji, 167 tons of 22% salt water and 250 Kg of malt. A pressure pump 19 is driven to feed to the system nitrogen gas containing some oxygen, e.g. air, at a rate of 250 ml/liter of moromi, warmed to 28° C by means of a temperature adjuster 10' through a pressure tank 15 and pipes 17, 18 into the charge at the bottom of the tank 1. After 5 to 10 seconds from the beginning of the ventilation, the warmed air is filled in the tank 1 and a part of the air gets out to the outlet pipe 7, thus causing slow circulation. Such a circulation is performed several times a day each for about 3 to 5 minutes.

When oxygen concentration of this circulation gas falls below about 3 to 5%, air is introduced through an air inlet 20 and a sterilization device 21 and supplied little by little via a valve 22, while temperature control is continued by means of the temperature controller 10' so that activity of soy sauce fermentation fungi do not lower. In such a case, if a gas obtained by burning air is used, there is no necessity to adopt a system for supplying air and nitrogen individually, but the use of the temperature controller 10' only is sufficient.

At the same time, a vacuum pump 9 is operated at a gauge pressure of 500 mm Hg. for 30 minutes 2 to 3 times a day. As a result, besides the movement of carbon dioxide gas by the ventilation gas, the carbon dioxide gas lying in the intermediate or bottom portion of the tank and difficult to move can be also discharged forcibly due to a pressure difference between the interior and exterior of the moromi caused by the reduced pressure at the top of the tank 1. The vacuum pump 9 also draws useful gas constituents together with carbon dioxide gas; generated during the fermentation and inert gas therefore these also are introduced to the circulation liquid reservoir 30 and mixed with the moromi led out of the bottom of the tank, the solid and liquid moromi constituents having been separated from each other by means of a screen 3, and the gases are dissolved in the moromi.

A portion of the resultant mixed liquid is injected to the annular portion of tank from a liquid injection opening 32 by means of the circulation pump 31, while a second portion is introduced to a gas liquid separating tower 33 where the excess carbon dioxide gas is discharged outside, the $CO_2$ free moromi being then led to a liquid injection pipe 34. The pipe 34 is preferably shaped so that its forward end portion is formed into a loop shape having an inside diameter smaller than that of the tank 1 and arranged at the upper portion of such tank. The $CO_2$ free moromi is sprayed from the pipe 34 through nozzles 35 over the surface of the moromi liquid particularly near the wall portion of the tank thereby moving the moromi near the wall portion of tank downwardly thus assisting the circulation of all moromi within the tank. In this stage, the useful volatile constituents are perfectly dissolved in the moromi within the tank resulting in forming a moromi rich in the useful volatile constituents.

The injection pipe 34 above the surface of moromi liquid is not limited to one. If several of these pipes are provided, it is possible to spread the moromi over the floating koji so that it sinks at a time, and simultaneously to make the circulation of moromi smooth owing to the spreading of the moromi cooled at the bottom of the tank. The number of injection pipes 32 mounted in the portion of the circulation inner cylinder 2 may also be suitably increased as needed.

As indicated above, the moromi is decomposed by the action of enzymes such as amylase, protease and other enzyme contained in the malt, with the result that the viscosity becomes lower and thus agitation by gas becomes easy.

The useful volatile constituents discharged with the mixed gas from the moromi tank can be returned to the tank, so that loss of the volatile constituents is almost entirely prevented. Also, the amount of oxygen is restrained to a minimum amount necessary for the fermentation, so that oxidation of moromi constituents is restrained to the utmost.

The intermittent circulating ventilation was continued for about one month until the fermentation of the beginning and intermediate stages was completed; thereafter a pause of the ventilation was performed at long intervals to carry out the ripening fermentation of the latter stage for about one and a half months and then the fermentation of moromi was finished.

After the end of fermentation, the resultant moromi was filtered thereby obtaining a soy sauce products rich in sugar and alcohol contents, light in color and having sweet smell. Thus a soy sauce of superior quality which has never been attained by the prior art method has been produced in a very short period according to the present invention.

It is to be understood that the invention is not limited to the embodiments disclosed which are illustratively offered and that modifications may be made without departing from the invention.

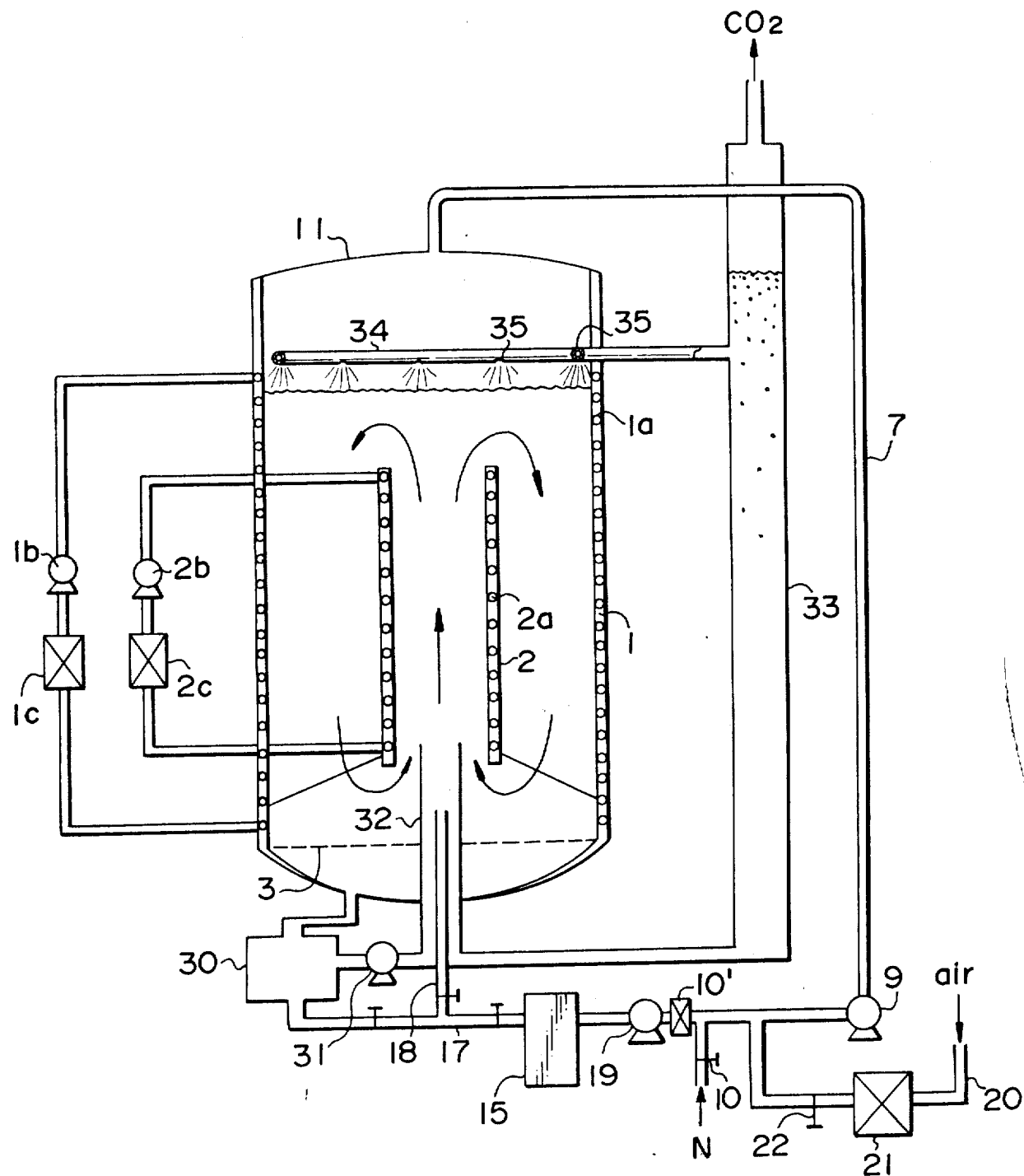

What is claimed is:

1. A method of brewing soy sauce comprising
    charging soy sauce moromi to a closed type large capacity tank provided with a hollow internally disposed cylinder for moromi circulation,
    feeding an inert gas at the bottom of the cylinder including a necessary minimum amount of oxygen at 25° C to 35° C through the moromi thereby promoting circulation,
    pumping the inert gas to effect recirculation thereof from the top of said tank to the bottom of the cylinder thus creating a reduced pressure at the upper portion of the tank;
    withdrawing a part of the moromi from the bottom of the tank,
    discharging inert gas and carbon dioxide produced by fermentation from said withdrawn moromi in a gas-liquid separating tower, and
    re-circulating the degased moromi to the upper part of the tank at the periphery thereof.

2. A method as claimed in claim 1, wherein said inert gas is produced by burning air thereby reducing an unnecessary amount of oxygen therefrom.

3. A method as claimed in claim 1, comprising adding a carbohydrate decomposing enzyme, a protein decomposing enzyme, fat decomposing enzyme or mixtures thereof.

4. A method as claimed in claim 1, wherein the hollow internally disposed cylinder is heated, and the wall of said tank is cooled.

5. A method of brewing soy sauce comprising charging soy sauce moromi to a closed-type large capacity tank having therewithin a hollow cylinder coaxial with said tank and open at the top and bottom, feeding an inert gas containing approximately 2–3% oxygen at 25°–35° C. to said moromi in said tank near the bottom of said hollow cylinder, thereby promoting upward circulation of the moromi through the hollow cylinder, removing gas from the tank at the top to provide a reduced pressure at the upper portion of the tank, and recirculating at least a portion of said gas to said moromi in said tank at the bottom of the cylinder, withdrawing a part of the moromi from the bottom of the tank and feeding a first portion of the part so withdrawn back to the tank near the bottom of said hollow cylinder to promote the circulation of the moromi, while discharging carbon dioxide gas produced by fermentation out of the other portion of the moromi and then feeding the degassed moromi to the top of the fermentation tank at the periphery thereof, and heating the wall of the hollow cylinder while cooling the wall of the tank, whereby the moromi is circulated upwardly through the hollow cylinder and downwardly between the cylinder and the tank walls.

* * * * *

UNITED STATES PATENT OFFICE
CERTIFICATE OF CORRECTION

Patent No. 4,008,333  Dated February 15, 1977

Inventor(s) Masahiko Izumi

It is certified that error appears in the above-identified patent and that said Letters Patent are hereby corrected as shown below:

Insert the Drawing Figure, as shown on the attached sheet.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*